United States Patent [19]
Peters

[11] Patent Number: 5,644,564
[45] Date of Patent: Jul. 1, 1997

[54] VACUUM CHUCK FOR ROTATING DATA DISCS

[75] Inventor: Roger Peters, Hayward, Calif.

[73] Assignee: Phase Metrics, San Diego, Calif.

[21] Appl. No.: 406,163

[22] Filed: Mar. 17, 1995

[51] Int. Cl.$^6$ .......................... G11B 17/028; G11B 25/04
[52] U.S. Cl. ........................................ 369/270; 360/99.12
[58] Field of Search ...................................... 369/270, 271, 369/282; 360/98.08, 99.05, 99.12

[56] References Cited

U.S. PATENT DOCUMENTS

| | | | |
|---|---|---|---|
| 4,493,072 | 1/1985 | Shibata | 369/271 |
| 5,025,340 | 6/1991 | Peters | 369/270 |
| 5,048,005 | 9/1991 | Ekhoff | 360/99.05 |
| 5,056,082 | 10/1991 | Ekhoff | 360/99.05 |

FOREIGN PATENT DOCUMENTS

| | | | |
|---|---|---|---|
| 58-215703 | 12/1983 | Japan | 369/271 |
| 61-214272 | 9/1986 | Japan | 369/271 |
| 62-212957 | 9/1987 | Japan | 369/270 |
| 62-212958 | 9/1987 | Japan | 369/270 |
| 4-353663 | 12/1992 | Japan . | |

*Primary Examiner*—Stuart S. Levy
*Assistant Examiner*—David L. Ometz
*Attorney, Agent, or Firm*—Blakely Sokoloff Taylor & Zafman

[57] ABSTRACT

A pneumatically operated vacuum chuck for releasably securing data discs includes an arbor with an annular land disposed at the distal end thereof to engage the inner periphery of the disc. An annular groove is formed concentrically in the land to exert a suction grip on a data disc. A piston assembly is secured in a bore within the arbor, the distal end of the piston assembly including a resilient bushing that expands diametrically upon proximal retraction to block the egress path of the disc from the annular land. The piston head engages the bore with a sliding seal, and the sealed interior chamber of the arbor communicates with the annular groove at the distal end of the arbor. A compression spring biases the piston assembly proximally, and air pressure applied to the proximal end of the piston assembly drives the piston assembly distally against the spring. An air channel extends axially through the piston assembly from the proximal end thereof to the sealed interior chamber of the arbor, and a check valve disposed in the air channel transfers vacuum pressure to the annular groove and blocks pneumatic pressure. Pneumatic pressure translates the piston assembly distally, releasing the resilient bushing from blocking removal of the data disc on the annular land, and releasing the vacuum suction on the disc.

6 Claims, 3 Drawing Sheets

VACUUM CHUCK FOR ROTATING DATA DISCS

BACKGROUND OF THE INVENTION

The present invention generally relates to devices for securing data discs and other record discs in releasable fashion, and in particular to a chuck for releasably securing a disc for high speed rotation during manufacturing and testing.

With the recent surge in sales of home computers and the increasing computerization of business and industry, data storage discs have become ubiquitous. Floppy discs, hard discs, CD ROM discs, magneto-optical discs, and the like have become very familiar to the general public, and their usage is measured in billions of discs per year. Due to the enormous numbers of data discs that are processed, it is essential that automated manufacturing equipment be employed to a maximum extent, so that costs may be held to a minimum. In the manufacture of these data discs, there are many process steps in which each disc must be releasably mounted on a rotatable arbor. Such process steps may include application of surface coatings, as well as cleaning, polishing, burnishing, and testing.

There are known in the prior art various forms of rotating disc chucks for releasably mounting a disc during an automated manufacturing process step. Due to the fact that data discs must conform to extremely close tolerances for planarity, surface finish, and coating integrity, the chuck securing a disc during processing must grip the disc with a high degree of centration, and cannot impart any curvature to the disc. Moreover, the chuck must grip the disc only at portions that will not be used for data recording.

One exemplary form of rotating disc chuck known in the prior art is described in U.S. Pat. No. 5,025,340, issued Jun. 18, 1991 to the present inventor. It employs an elastomeric bushing having a truncated conical configuration mounted coaxially on the outer end of the chuck, with an internal pneumatic piston coupled to the bushing. The periphery of the bushing is expanded against an annular land to hold a data disc adjacent to the edge of the central hole therein, and the piston is operated to drive the bushing in the axial direction and release the disc.

SUMMARY OF THE PRESENT INVENTION

The present invention generally comprises a pneumatically operated chuck for releasably securing data discs and the like for processing and testing procedures. The chuck relies primarily on vacuum suction to hold a disc, and secondarily on a resilient deformable bushing to secure the disc.

The chuck includes an arbor secured at its proximal end to a rotatable tool, with an annular land disposed at the distal end of the arbor to engage the inner periphery of a data disc. An annular groove is formed concentrically in the land to exert a vacuum suction effect on a data disc and retain the disc on the arbor. A reciprocating piston assembly is secured in a stepped bore within the arbor, the distal end of the piston assembly extending coaxially and outwardly from the distal end of the arbor. A resilient bushing is secured to the distal end of the piston, the bushing having a truncated conical configuration tapering distally and having a peripheral edge adapted to releasably engage a tapered knob disposed coaxially within the annular land of the arbor.

The proximal end of the piston assembly engages the bore of the arbor with a sliding seal, and the sealed interior chamber of the arbor communicates with the annular groove at the distal end of the arbor. A compression spring disposed about the piston assembly resiliently biases the piston assembly proximally, and air pressure applied to the proximal end of the piston assembly drives the piston assembly distally against the compression spring. An air channel extends axially through the piston assembly from the proximal end thereof to the sealed interior chamber of the arbor, and a check valve disposed in the air channel limits pressurized air flow in the distal direction.

In its quiescent condition, the chuck has a partial vacuum applied to the proximal end of the piston which works in concert with the compression spring to bias the piston assembly proximally. As a result, the distal end of the piston assembly is retracted proximally, and the resilient bushing retracts sufficiently on the tapered knob of the arbor to spread the periphery of the bushing and block egress of a disc secured on the annular land. That is, the periphery of the bushing obstructs the removal path of the inner edge of a disc loaded on the arbor, preventing accidental release of the disc. The partial vacuum is also applied through the check valve to the annular groove, and to the disc, the suction effect holding the disc on the annular land. The suction effect is the primary means of securing the disc to the arbor.

When pneumatic pressure is applied to the proximal end of the piston, the piston is driven distally against the compression spring, and the distal end of the piston assembly extends distally from the knob end of the arbor. The resilient bushing retracts diametrically as it translates distally, so that the egress path of the data disc on the annular land is no longer blocked. The residual vacuum within the annular groove and associated passages quickly dissipates, and the disc is free to be removed from the chuck.

DESCRIPTION OF THE PREFERRED EMBODIMENTS

The present invention generally comprises a pneumatically operated chuck that relies primarily on vacuum suction for releasably securing data discs during processing and testing procedures. The chuck also includes a resilient deformable bushing as a secondary measure to prevent accidental release of the disc.

Figure 2:
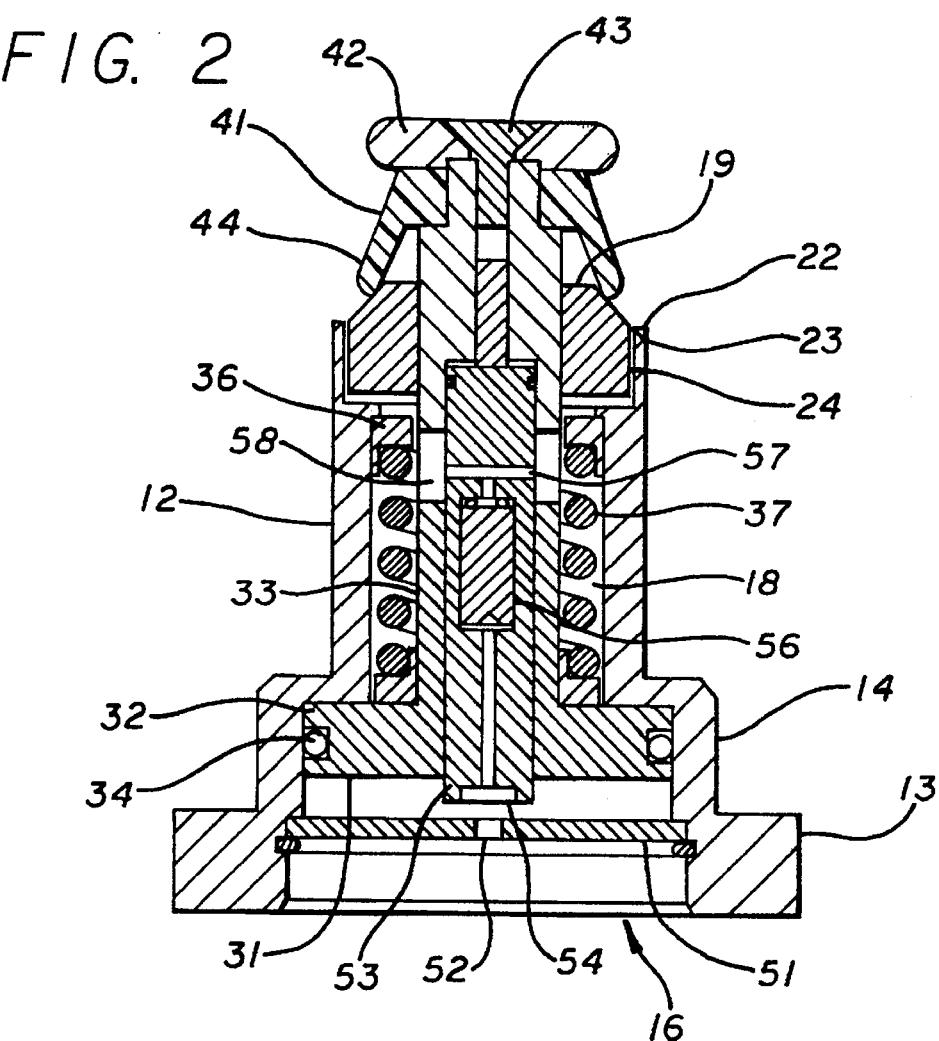
FIG. 2 is a cross-sectional elevation of the disc chuck of the invention, shown in a extended, disc-releasing disposition.
Figure 3:
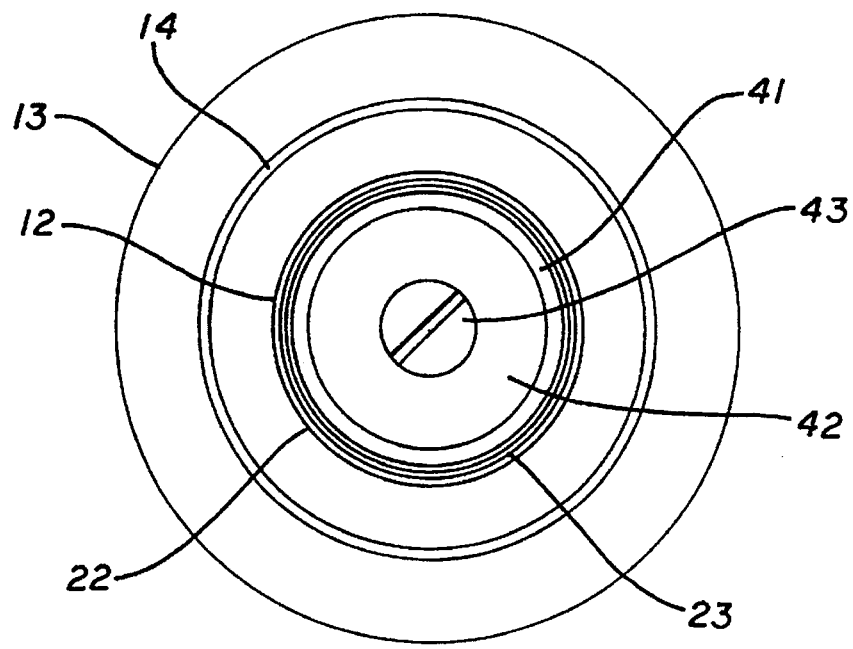
FIG. 3 is an end view of the disc chuck as shown in FIG. 2.

With regard to the accompanying drawing, and FIGS. 2 and 3 in particular, the chuck includes an arbor 11 having a generally cylindrical body 12 and a flange 13 extending radially from the proximal end. The flange 13 is joined to the body 12 by a stepped annular shoulder 14. A bore 16 is formed coaxially within the arbor, the bore comprising a wide proximal portion 17 disposed within the flange 13 and shoulder 14, as well as a narrow portion 18 disposed within the body 12. At the distal end of the arbor, a protruding knob end 19 extends coaxially and includes a beveled annular surface 21. An annular land 22 extends concentrically about the beveled annular surface 21, and an annular suction groove 23 opens distally in the land 22. The suction groove 23 is connected to the bore portion 18 by a plurality of passages 24 extending therebetween.

Disposed within the bore 16 is a piston assembly 31. The piston assembly includes a piston head 32 disposed within the wide proximal portion 17 of the bore and provided with a sliding seal 34. A piston shaft 33 extends distally from the piston head, and is oriented axially within the narrow portion 18 of the bore 16. A spring keeper 36 is secured in the bore portion 18, and a compression spring 37 is secured about the shaft 33 between the keeper 36 and the piston head 32 to bias the piston assembly proximally. The distal end of the shaft 33 extends axially through the knob end 19. A resilient bushing 41 is secured to the distal end of the shaft 33 by a cap plate 42 and a screw 43 secured axially in the end of the shaft. The bushing 41 has the configuration of a truncated cone tapering distally, and the proximal portion of the bushing comprises a flexible skirt 44 that is disposed to impinge on the beveled surface 21 in slidable fashion.

The piston assembly 31 also incorporates a check valve system for transferring vacuum pressure and preventing application of pneumatic pressure to the suction groove 23. An end plate 51 is secured in the proximal opening of the wide bore portion 17, and is provided with an inlet port 52 extending axially therethrough. A valve stem 53 is disposed within a bore extending axially through the piston assembly, and is provided with a central flow channel 54 extending therethrough. The channel 54 joins a passage 57 extending diametrically in the valve stem, the passage 57 being disposed in flow communication with ports 58 formed in the piston shaft 33. A check valve 56 is interposed between the flow channel 54 and the passage 57.

Figure 1:
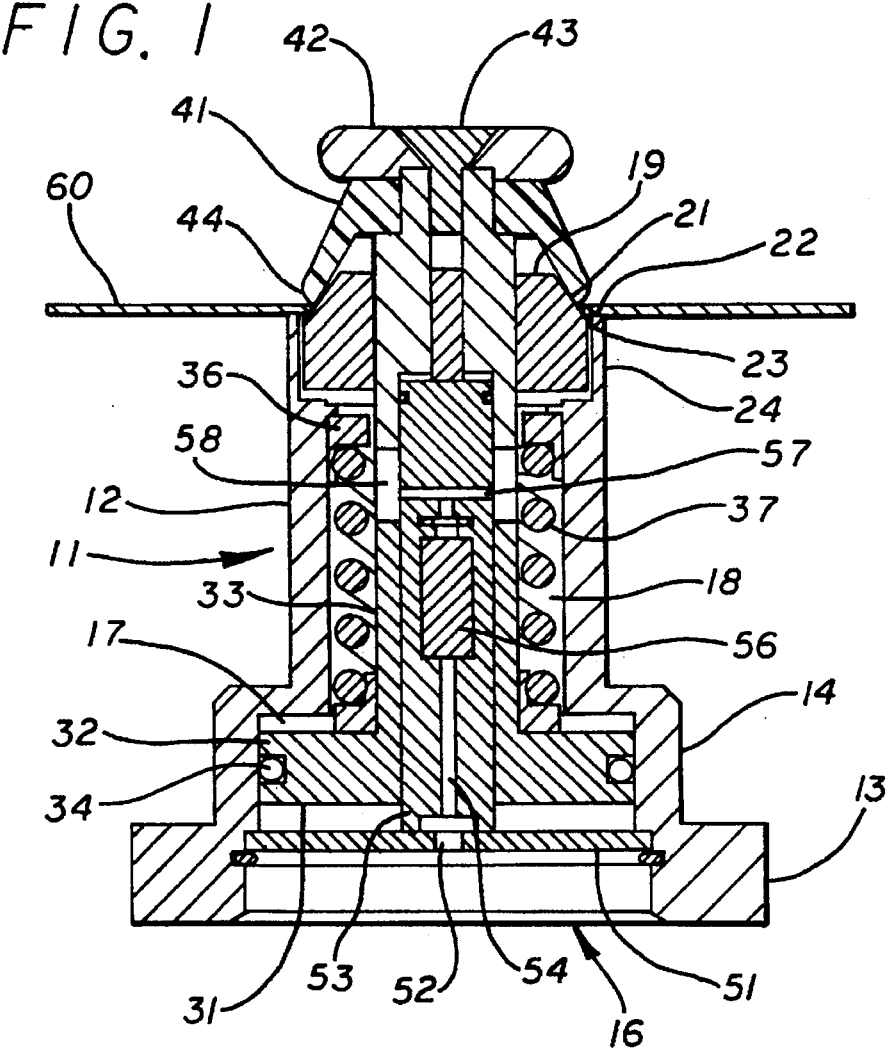
FIG. 1 is a cross-sectional elevation of the disc chuck of the invention, shown in a retracted, disc-engaging disposition.
Figure 6A:
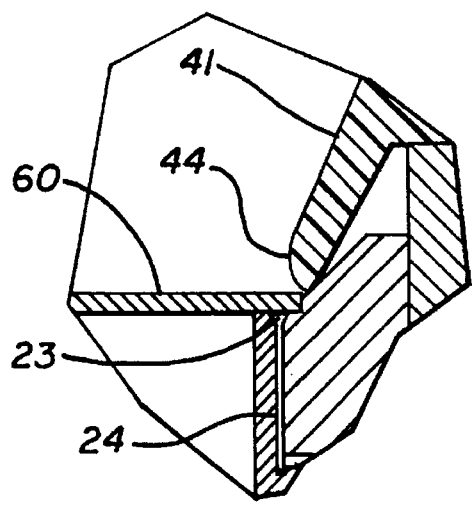
FIGS. 6a and 6b are magnified cross-sectional side elevations showing the relationship of the annular land, vacuum groove, and the resilient bushing expanded and retracted, respectively.

It is noted that the proximal outlet of the flow channel 54 is aligned with the inlet port 52. When vacuum pressure is applied to the inlet port 52, the check valve is opened and the vacuum pressure is applied through channels 57, 58, and 24 to the groove 23. The suction effect at the groove 23 grips a data disc and secures it to the land 22. The pressure differential and the spring 37 combine to urge the piston assembly proximally. The proximal end of the valve stem impinges on the end plate 51 to form a hard stop for the piston assembly, with the flow channel 54 and the inlet port 52 in intimate contact (FIG. 1). In this retracted position of the piston shaft 33, the resilient bushing 41 is likewise retracted, so that the periphery of the skirt 44 is caused to slidably engage the beveled surface 21 and expand radially. As shown in FIG. 6a, the periphery of the skirt 44 thus expands to a diameter greater than the inner diameter of the data disc 60 secured on the land 22 as a secondary measure to prevent accidental release of the data disc 60. The skirt does not impinge on the data disc, yet it prevents release of the disc from the arbor.

Figure 6B:
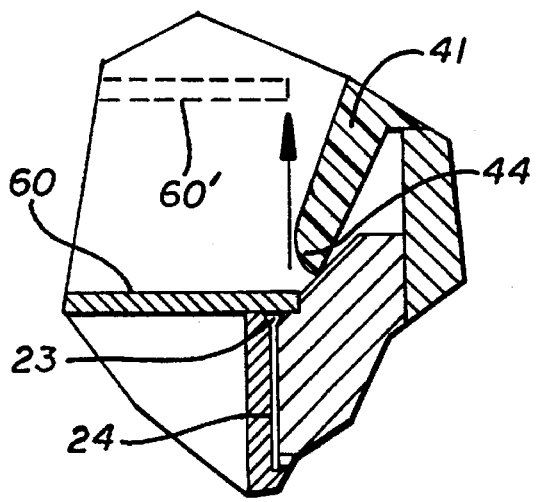
Figure 4:
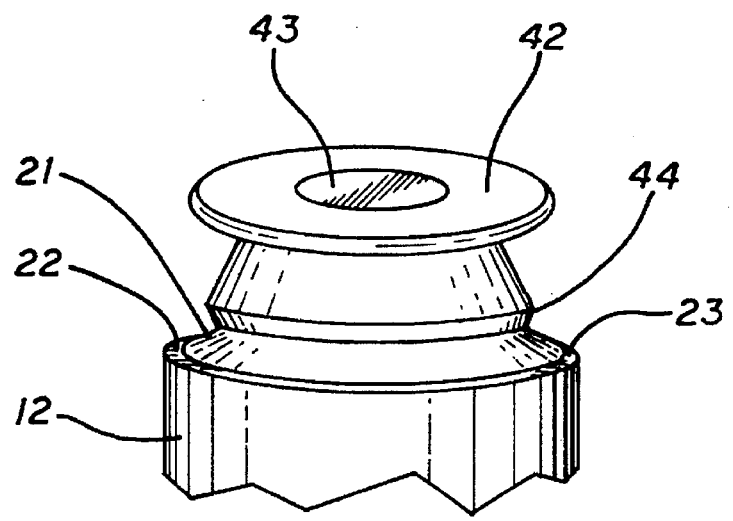
FIG. 4 is a perspective view of the distal portion of the disc chuck, shown in the extended, disc-releasing disposition.

When air pressure is first applied to the proximal end of the piston assembly, the piston is driven distally against the force of spring 37. Check valve 56 is closed by the positive pressure, preventing air flow through the channel, and preventing blow-off of the data disc 60. Simultaneously, the distally translating piston shaft 33 translates the resilient bushing 41, and the skirt 44 thereof retracts diametrically from the annular land 22. The egress path of disc 60 is thus cleared, and the disc may be removed from the chuck (FIGS. 4) as indicated by reference numeral 60' in FIG. 6b. Any residual vacuum pressure within the arbor quickly dissipates, so that the disc is released from the chuck.

Figure 5:
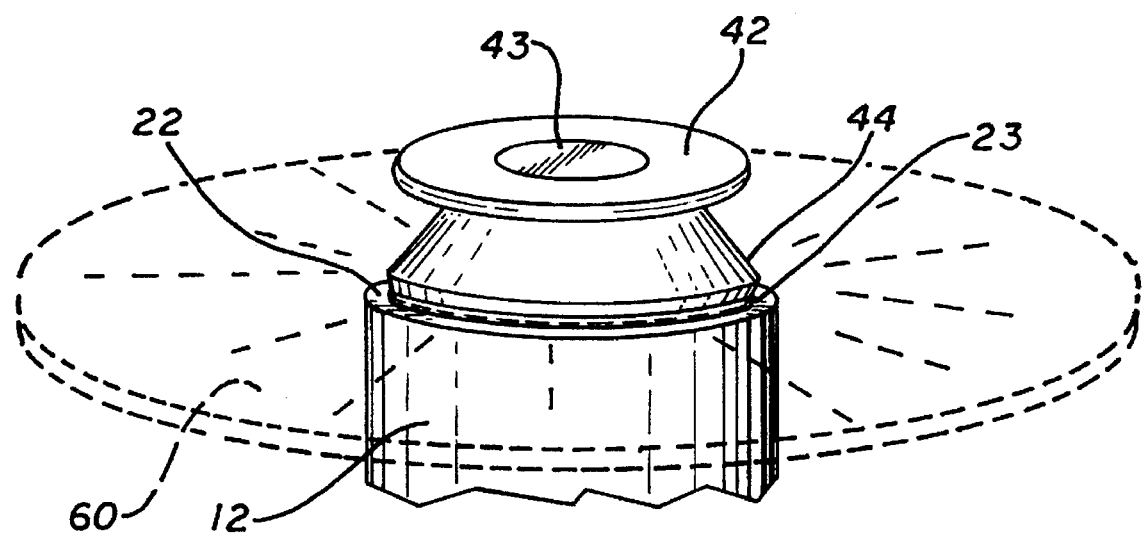
FIG. 5 is a perspective view of the distal portion of the disc chuck, shown in the retracted, disc-engaging disposition.

To mount another disc on the chuck, the disc is placed on the chuck in contact with the annular land 22. Positive air pressure at the inlet port 52 is terminated, and vacuum pressure applied to the proximal end of the piston together with the restoring force of the spring 37 drives the piston assembly proximally. The partial vacuum which is applied through channels 24 to the suction groove 23 creates a suction effect that clamps the disc to the land 22, securing the disc thereon. At the same time, the piston shaft 33 moving proximally pulls the resilient bushing proximally, causing the skirt 44 thereof to expand diametrically as it translates along the beveled surface 21 (FIG. 5). The skirt forms a secondary safety means for securing the disc 60 to the chuck in the unlikely event of vacuum failure.

To release the disc, air pressure is once again applied to the inlet port, as described previously, and the process is reiterated. The suction grip provided by the chuck is very uniform in the distribution of force about the inner disc periphery, resulting in greater planarity of the disc during processing on the chuck.

I claim:

1. A chuck that secures a disk that has a center opening and an inner diameter, comprising:

an arbor that supports the disk;

a vacuum system that pulls the disk onto said arbor;

a knob which has a tapered surface;

a piston assembly that moves relative to said knob and is pneumatically driven between a first position and a second position;

a bushing that is attached to said piston assembly and slides along said tapered surface of said knob such that when said piston assembly is in the first position said bushing is expanded to a position that is separated from the disk by a space but has a first diameter that is greater than the inner diameter of the disk to prevent removal of the disk, and when said piston assembly is in the second position said bushing is retracted to a second diameter to allow removal of the disk; and, a positive pressure system that pushes said piston assembly to the second position.

2. The chuck as recited in claim 1, further comprising a spring that biases said piston assembly into the first position.

3. The chuck as recited in claim 1, further comprising a vacuum channel that is in fluid communication with said vacuum system and the disk.

4. The chuck as recited in claim 3, further comprising a check valve that closes said vacuum channel when said piston is pushed to the second position.

5. The chuck as recited in claim 4, wherein said piston assembly includes a valve stem that engages an end plate when said piston assembly is in the first position.

6. The chuck as recited in claim 5, wherein said valve stem has an axial opening and said check valve is located within said axial opening.

* * * * *